United States Patent
Roth (10) Patent No.: US 9,156,235 B2
(45) Date of Patent: Oct. 13, 2015

(54) MODULAR PRODUCTION DEVICE FOR INTEGRAL FIBER SEMIFINISHED PRODUCTS AND METHOD FOR PRODUCING ENDLESS-FIBER COMPOSITE COMPONENTS MADE FROM INTEGRAL FIBER COMPOSITE SEMIFINISHED PRODUCTS HAVING A HOLLOW BODY STRUCTURE

(75) Inventor: Daniel Roth, Herrenberg (DE)

(73) Assignee: Daimler AG, Stuttgart (DE)

( * ) Notice: Subject to any disclaimer, the term of this patent is extended or adjusted under 35 U.S.C. 154(b) by 358 days.

(21) Appl. No.: 13/883,825

(22) PCT Filed: Sep. 24, 2011

(86) PCT No.: PCT/EP2011/004791
§ 371 (c)(1),
(2), (4) Date: May 7, 2013

(87) PCT Pub. No.: WO2012/069102
PCT Pub. Date: May 31, 2012

(65) Prior Publication Data
US 2013/0232938 A1    Sep. 12, 2013

(30) Foreign Application Priority Data

Nov. 26, 2010 (DE) .......................... 10 2010 052 737

(51) Int. Cl.
| | |
|---|---|
| *B32B 37/00* | (2006.01) |
| *B29C 53/56* | (2006.01) |
| *B29C 53/82* | (2006.01) |
| *D02G 3/36* | (2006.01) |
| *B29C 53/80* | (2006.01) |

(52) U.S. Cl.
CPC .......... *B32B 37/0046* (2013.01); *B29C 53/564* (2013.01); *B29C 53/821* (2013.01); *D02G 3/36* (2013.01); *B29C 53/8075* (2013.01)

(58) Field of Classification Search
CPC .. B32B 37/0046; B29C 53/564; B29C 53/821
USPC .............................................. 87/34
See application file for complete search history.

(56) References Cited

U.S. PATENT DOCUMENTS

| 1,224,878 | A | * | 5/1917 | Fisher ................................. 87/1 |
| 2,557,816 | A | * | 6/1951 | Di Palma .......................... 87/34 |
| 4,376,669 | A | * | 3/1983 | Math ............................ 156/161 |

(Continued)

FOREIGN PATENT DOCUMENTS

| FR | 2664529 A1 | 1/1992 |
| JP | 58005221 A | 1/1983 |
| WO | 2009058060 A1 | 5/2009 |

*Primary Examiner* — Shaun R Hurley (74) *Attorney, Agent, or Firm* — Patent Central LLC; Stephan A. Pendorf (57) ABSTRACT

A modular production device for integral fiber semi-finished products and a method for the creation of endless fiber composite components having a hollow body structure after the production of such integral fiber semi-finished products. The modular production device has at least one moveably guided fiber guide tube (100), at least one base element (2, 2') and a plurality of hollow bodies (7) that are separated from one another in a row by a gap (8) and that can be fastened to an inner wall of the base element (2, 2'). Each hollow body (7) has at least one base (6) at least on one side, wherein the gap (8) has a width that provides a passage for the fiber guide tube (100).

14 Claims, 5 Drawing Sheets

(56) References Cited

U.S. PATENT DOCUMENTS

| | | | |
|---|---|---|---|
| 4,614,147 A * | 9/1986 | Vendramini | 87/5 |
| 4,893,543 A * | 1/1990 | Phillips | 87/34 |
| 5,091,029 A * | 2/1992 | Davis et al. | 156/174 |
| 5,911,731 A * | 6/1999 | Pham et al. | 606/191 |
| 7,093,527 B2 * | 8/2006 | Rapaport et al. | 87/34 |
| 8,459,164 B2 * | 6/2013 | Lilburn et al. | 87/34 |
| 8,789,452 B1 * | 7/2014 | Janardhan et al. | 87/9 |
| 2002/0160068 A1 * | 10/2002 | Nakamura | 425/112 |
| 2003/0010424 A1 * | 1/2003 | Lindenau | 156/173 |
| 2005/0283962 A1 * | 12/2005 | Boudjemline | 29/433 |
| 2009/0014114 A1 * | 1/2009 | Yeh et al. | 156/172 |
| 2009/0112251 A1 * | 4/2009 | Qian et al. | 606/194 |
| 2009/0198315 A1 * | 8/2009 | Boudjemline | 623/1.2 |
| 2010/0230417 A1 | 9/2010 | Berglund | |
| 2011/0115124 A1 * | 5/2011 | Barlag | 264/258 |

* cited by examiner

MODULAR PRODUCTION DEVICE FOR INTEGRAL FIBER SEMIFINISHED PRODUCTS AND METHOD FOR PRODUCING ENDLESS-FIBER COMPOSITE COMPONENTS MADE FROM INTEGRAL FIBER COMPOSITE SEMIFINISHED PRODUCTS HAVING A HOLLOW BODY STRUCTURE

BACKGROUND OF THE INVENTION

1. Field of the Invention

The invention relates to a modular production device for integral fibre semi-finished products and a method for the creation of endless fibre composite components having a hollow body structure after the production of such integral fibre semi-finished products.

2. Description of the Related Art

Various methods are known for producing fibre semi-finished products that are re-processed into motor vehicle components and that provide high levels of mechanical strength with a simultaneously low weight. The production of the motor vehicle components is carried out from fibre semi-finished products that form fibre composite components by adding a matrix material to the fibre cores or webs and subsequent curing. The fibre cores or webs can be cut by hand or machine, laid and layered on top of one another according to the structural loads. Here, the individual layers can be fixed by adhesive sprays or sewing, for example. The fibre pre-moulding created in this way can then be inserted into a mould and then soaked with a resin by hand lamination or vacuum infusion.

Manual production is time-consuming, leads to high tolerances and is carried out without endless fibres, at the expense of mechanical strength, whereas, with the automatic laying method, predetermined lengths of an endless material are cut by a machine and can be laid automatically on a flat or curved shape. There are no endless fibres present in the final product, such that this also has lower levels of mechanical strength.

The filament winding method is used to lay the endless fibre strands, also known as rovings, onto a fundamentally cylindrical shape. Fibres are hereby positioned to lie very tight and close to one another, with a high level of dimensional accuracy. To wind the fibres, a body is necessary, which gives its later shape to the component, wherein only simple cylindrical geometries have been implemented thitherto.

Complex geometries can be achieved by stitching; here, a further roving is fixed to the carrier material by threading. With this method, the roving can follow almost any curve progression; in this instance, however, it is difficult to have large wall thicknesses.

Based on the prior art, the object is provided to create a production device for integral fibre semi-finished products made from endless fibres for the production of hollow bar elements, which can have a complex geometry and still have a high level of tensile strength, compressive strength and torsional strength.

BRIEF SUMMARY OF THE INVENTION

A modular production device according to the invention for integral fibre semi-finished products made from endless fibres for the production of endless fibre composite components with a hollow body structure here comprises, according to the invention, at least one movably guided fibre guide tube, which is typically loaded via a spindle with an endless fibre or an endless fibre bundle. Furthermore, it has at least one base element and several hollow bodies, which are attached to an inner wall of the base element at a distance from one another in a row through a gap. Here, the hollow body has at least one base on at least one side. The gap between the hollow bodies has a width that exactly enables the fibre guide tube to pass therebetween. Thus, first an arrangement is created than enables an underside of the hollow body, with respect to the base element, to advantageously have a fibre winding added to it, which occurs through the guide tube without this having to be guided on all sides around the hollow body that is being wrapped.

In fact, the guide tube can be arranged on a robotic arm and still reaches all sides of the hollow body.

Furthermore, the device comprises a number of intermediate-space bodies that can be inserted into the gap in an accurately fitting manner with respect to the shape of the gap—in this way, the sequence of hollow bodies is stabilised, once the first windings have been performed. A reversal element is provided on each front end of the hollow body row so that the endless fibre can be forwarded and guided under tension around the hollow body, said element being fastened to each inner wall of the base element. Advantageously, the device according to the invention enables the simple, all-round and automatic wrapping of the hollow bodies, which form a bar element when arranged in a row.

The modular production device can further provide that the base element be able to be designed with at least one cover element that can be fastened releasably to the base element as a sheathing element for the endless fibre composite components; in this way, by filling the sheathing with matrix material, mainly with resin, the fibre composite material can be produced.

Should larger hollow struts be moulded, the modular production device can be constructed from many sheathing elements that are components of a sheathing element set. Then, several channel-forming base elements are required, which have connecting openings via which at least two base elements can be connected to one another positively.

Finally, complex three-dimensional strut structures can be formed, while the sheathing elements of the sheathing element set are strut elements and node elements for the construction of an hermetically sealed three-dimensional sheathing structure. The strut elements and node elements can each consists of the channel-forming base element and, optionally, the covering element, depending on whether the sheathing element is to be filled with matrix material or whether the wound fibre semi-finished product is removed from the base element and then infiltrated with matrix material.

This can occur, for example, in a vacuum bag.

The base of the hollow bodies can be set up as a filling opening; in this way, the hollow bodies can be filled with, for example, lightweight material such as a light metal, a light metal alloy or a polymer, in order to give even more stability to the structure.

Furthermore, a protrusion is present on the inner wall of the base element for each hollow body that is to be fixed, which can be brought into releasable engagement positively with at least one base in the manner of LEGO, for example.

The hollow bodies that are to be wrapped by the endless fibres and are finally to form the core of the fibre semi-finished product can be polyhedral, cuboid, cylindrical or bodies with an elliptical cross-section.

To enable an ideal winding of the hollow body row, it is proposed that the intermediate-space body have a bypass adapter at at least one edge side.

Now, to produce the endless fibre composite components with a hollow body structure, the production device according to the invention is used. Here, first the desired number of hollow bodies is fastened in a row to an inner wall of the base element and the hollow bodies are separated from one another by a gap. The fixing of the hollow bodies to the base element is carried out by means of the base of each hollow body. Finally, a respective reversal element is arranged at the front of the provided row of hollow bodies on the inner wall of the base element, if it is not in the desired position on the base element from the outset.

Now, the endless fibres can be guided along a laying path by means of the guide tube and then laid. The laying path comprises:

a) an underfloor path, which runs from a first reversal element and bi-directionally around the base of the row of hollow bodies to the second reversal element; here, the fibre guide tube is guided through the gap, b) a path, which delineates a three-dimensional shape around the hollow bodies and which extends at least from a first end of the row of hollow bodies to a second end, and c) an upper path, which runs on the side of the hollow bodies facing away from the lower path, and which extends from a first end of the row of hollow bodies to a second end bi-directionally around the bypass adapters of the intermediate-space elements. These were inserted into the gap before the path described above or below was laid, and they stabilise the structure; furthermore, in their preferred form, they provide bypass points for the upper path or even for the side path below. In this way, the laying path furthermore comprises the side path, wherein the sides of the hollow bodies are wrapped.

In this way, an integral fibre semi-finished product is obtained, wherein the hollow bodies form a core of the integral fibre semi-finished product by laying the endless fibres along the laying path. Finally—and this can happen in various ways—the impregnation of the fibre semi-finished product with a resin material can take place, and thus the endless fibre composite component can be obtained.

The preparation of the modular production device can comprise connecting at least two base elements to their connecting openings positively with one another, in order to be able to implement correspondingly large bar elements. Furthermore, after an integral fibre semi-finished product has been obtained, the releasable fastening of a covering element can take place on each channel-forming base element in order to obtain a sheathing element. Then the impregnation of the fibre semi-finished product with a matrix or resin material can be achieved by filling the sheathing element.

Finally, the provision of the modular production device can also comprise the connection of many channel-forming base elements, which are partly designed as strut elements and partly as node elements. Also, here, the positive connection to the connecting openings takes place. In this way, a three-dimensional structure can be constructed.

After the integral fibre semi-finished product has been obtained, the covering element can in turn by fixed by a respective base element in order to obtain an hermetically sealed three-dimensional sheathing structure. Then, the fibre semi-finished product can be impregnated with the resin material by filling the sheathing structure.

Fundamentally, the impregnation of the fibre semi-finished product with a resin material can also take place after the fibre semi-finished product has been released from endless fibres of the base element.

Thus, due to the device according to the invention and the corresponding method according to the invention, a lightweight endless fibre composite component that still guarantees tensile, compressive and torsional strength can be obtained, which has a core that can be formed by the hollow bodies arranged in a row bi-directionally with the intermediate-space bodies inserted in an accurately fitting manner between two adjacent hollow bodies.

By filling them with a lightweight material, in particular a light metal or a light metal alloy or a polymer, more stability can be given to the hollow bodies. Above all, the shear force stability of the endless fibre composite components formed can be increased in this way. The filling material can also be selected according to its damping effect with respect to deformation forces arising.

It is particularly advantageous that even highly complex endless fibre composite components with a three-dimensional framework structure, for example a cage structure, can be formed in the manner according to the invention, which find manifold applications in the construction of motor vehicles.

BRIEF DESCRIPTION OF THE DRAWINGS

These and other advantages are demonstrated by the description below with reference to the accompanying figures. The reference to the figures in the description serves to support the description and to facilitate understanding of the subject matter. Subject matters or parts of subject matters that are essentially the same or similar can have the same reference numerals added to them. The figures are only a schematic depiction of an embodiment of the invention.

The following can be seen in the figures.

DETAILED DESCRIPTION OF THE INVENTION

Figure 6:
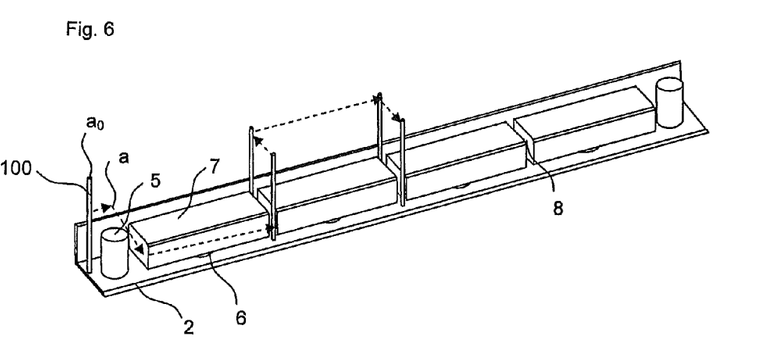
FIG. 6 a perspective side view of the hollow bodies arranged in a row with a schematic depiction of the path system of a fibre guide tube for the underfloor path, FIG. 7 a perspective bottom view onto a fibre of the hollow bodies arranged in a row laid along the underfloor path to form an underfloor segment, FIG. 8 a perspective side view of the hollow bodies arranged in a row with fibre progression guided three-dimensionally around the hollow bodies, FIG. 9 a perspective side view of the hollow bodies arranged in a row with a fibre laid along an upper path to form the upper mesh, FIG. 10 a perspective side view of the hollow bodies arranged in a row with several fibres laid around the sides of the hollow bodies, FIG. 11 a perspective view of a sheathing with hollow bodies inserted, FIG. 12 a perspective view of an exemplary embodiment of the base element of a sheathing added to a channel system, FIG. 13 a perspective view of the sheathing from FIG. 12 with endless fibres inserted and implied covering elements, FIG. 14 a perspective view of the sheathing from FIG. 12 that is hermetically sealed.
Figure 9:
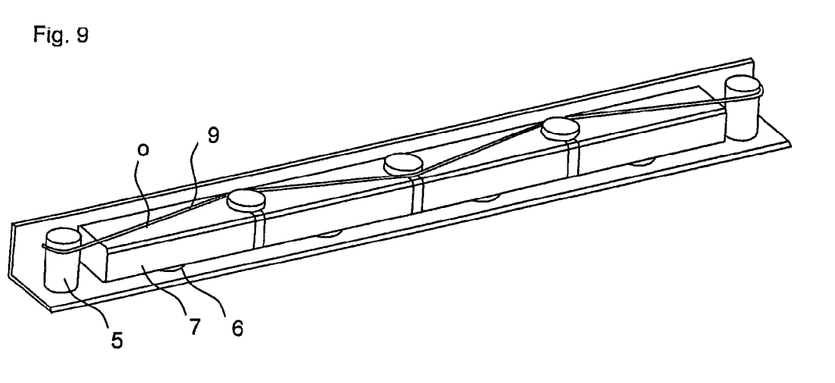

A simple modular production device for the production of an integral fibre semi-finished product made from endless fibres for the production of a bar-shaped endless fibre composite component is shown in FIG. 6 and FIG. 9 with the fundamental components.

Here (FIG. 6), the modular production device shows the guided fibre guide tube 100, as well as the base element 2, on which four hollow bodies 7 that are separated from one another in a row are fastened to an inner wall of the base element 2 through a respective gap 8. The gaps 8 are necessary to provide space for guidance through the fibre guide tube 100.

Figure 1:
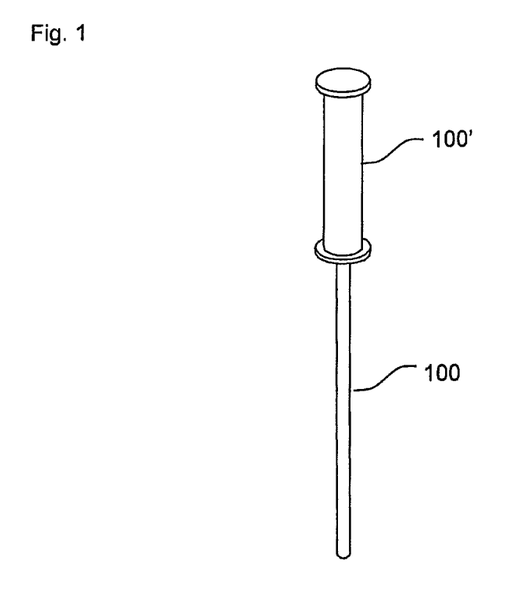
FIG. 1 a perspective side view of a fibre guide tube with a spindle.

A fibre guide tube 100, which is used for the precise laying and guiding of the fibre arrangement 9 or the roving, can be connected directly to a spindle 100' that serves as a fibre or roving store (cf. FIG. 1); this, however, is not necessarily required. The arrangement of the spindle 100', which is positioned for the advantageously automatic implementation of the winding on a robotic arm, is not embodied further below.

"Fibre arrangement 9" can be understood as an individual fibre, but also a fibre strand or fibres of the same or different composition that are interwoven with each other; furthermore, the fibre arrangement is guided herein as an endless fibre. The fibre arrangement 9 is guided from top to bottom through the hollow fibre guide tube 100, wherein the laying path described below, which the fibre guide tube covers, is guided accordingly by the robotic arm.

Figure 2:
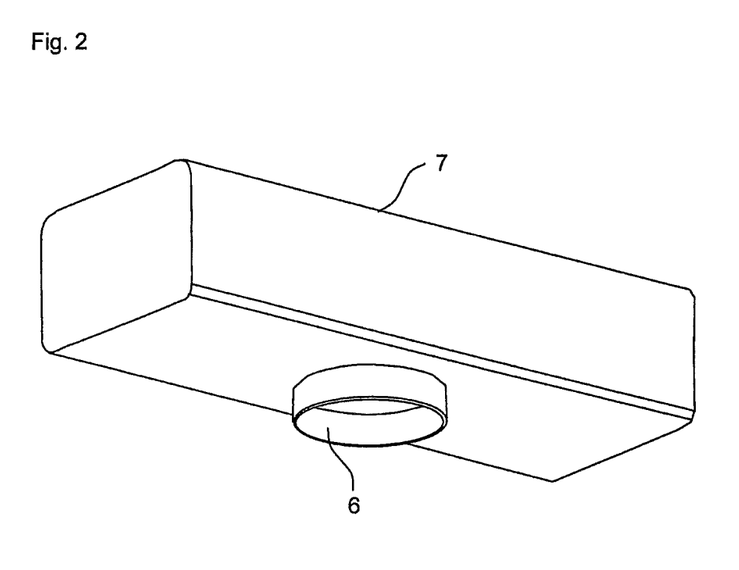
FIG. 2 a perspective bottom view of a hollow body according to the invention.
Figure 3:
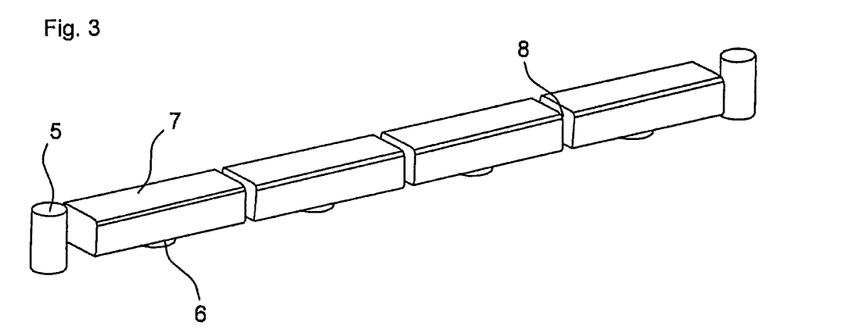
FIG. 3 a perspective side view of hollow bodies arranged in a row and frontal reversal elements, FIG. 4 a perspective side view of the hollow bodies arranged in a row from FIG. 3 with intermediate-space bodies arranged therebetween, FIG. 5 a perspective side view of a sheathing element made from a channel-forming base element and a covering element.

An individual hollow body 7 with a rectangular hollow body cross-section is depicted in FIG. 2; as is made clear, the hollow body 7 has a base 6 on its side pointing towards the base element 2. The geometry of the hollow body 7 can be selected flexibly. Thus, round, elliptical, rectangular and other hollow-body cross-sections are possible. The base 3 shown is cylindrical, but can also have a polygonal or elliptical basic shape. It serves to separate the hollow body 7 from the base, so as to allow the wrapping by enabling deviations to the targeted guided of the fibre arrangement 9.

It is furthermore possible to attach a further base, which is not depicted in the figures, to the upper side of the hollow bodies 7, which serves the same purposes as the bases 3 arranged on the underside of the hollow bodies 7, or even to provide additional bases on the sides of the hollow body 7.

Figure 4:
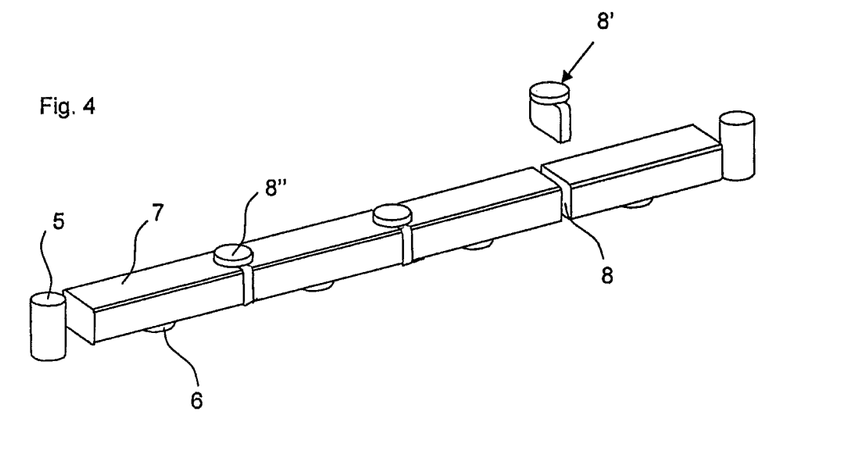
Figure 10:
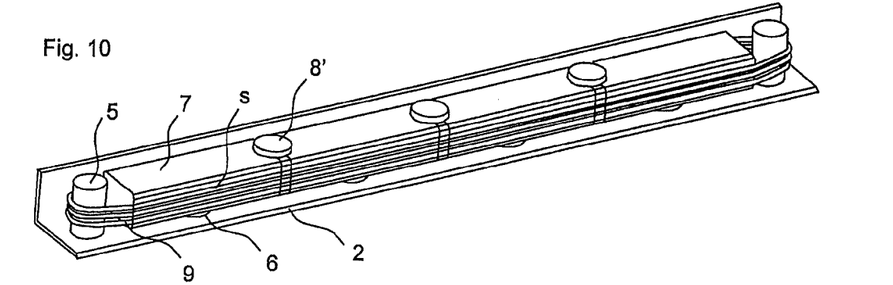
Figure 11:
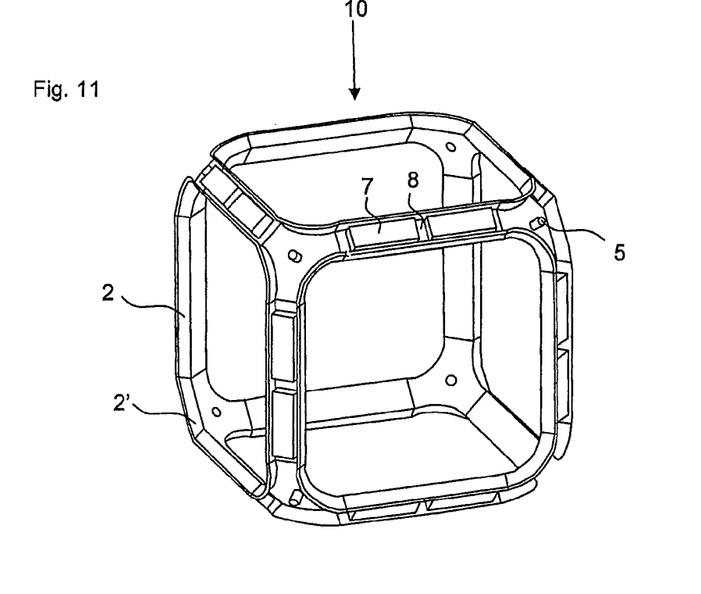

Finally, the modular production device comprises a number of intermediate-space bodies 8' that are to be seen in FIGS. 4, 9 and 10, wherein an intermediate-space body 8' can be inserted into the gap 8 between two respective hollow bodies 7 in an accurately fitting manner with respect to a gap shape. The intermediate-space bodies 8' that are to be inserted into the gap 8 are to be used shortly before the end in the embodiment of the laying path. The gap 8 between the hollow bodies 7 are filled with these intermediate-space bodies 8'—see also FIG. 4.

The reversal elements 5 arranged at the front of the hollow body row—see FIGS. 3, 4 and 7 to 13—are an important component of the modular production device and serve to divert the fibre arrangement 9 in the embodiment of the laying path. The reversal elements 5 are wrapped by the fibre strand 9 with respect to the fibre arrangement 9, such that this can be guided back under tension.

Figure 5:
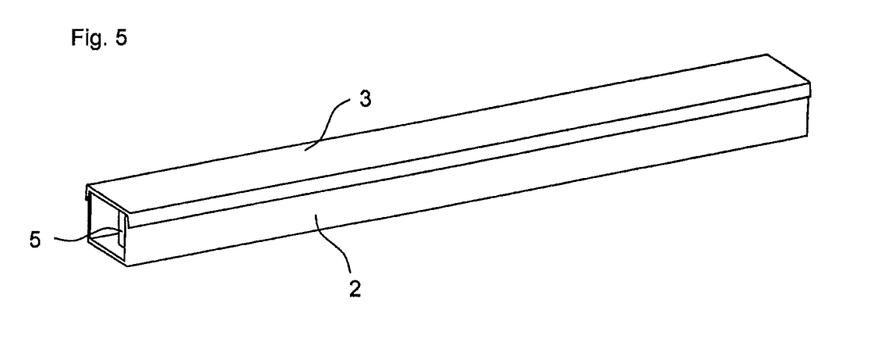

The modular production device can furthermore comprise a covering element 3—see FIG. 5—that can be fastened releasably to the base element 2. In this way, a sheathing element for the endless fibre composite components is created, in which the fibre semi-finished product can be impregnated with matrix material.

Figure 14:
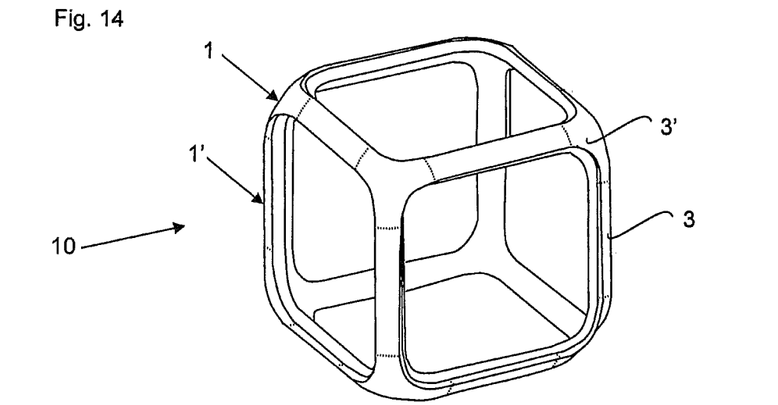

The modular production device can, for the formation of three-dimensional hollow body structures of the sheathing itself or even of the fibre semi-finished products, contain a plurality of sheathing elements 1, 1'—see FIG. 14—as components of a sheathing element set. The sheathing element set comprises a desired number of channel-forming base elements 2, 2', which provide connecting openings 4, 4', via which at least two base elements 2, 2' can be connected positively to each other. The "desired number" arises in a simple manner from the component geometry that is to be depicted. The sheathing elements 1, 1' of the sheathing element set can be strut elements 1' and node elements 1 for the construction of an hermetically sealed three-dimensional sheathing structure 10; wherein the strut elements 1' and node elements 1 each consist of the channel-forming base elements 2, 2' and the covering elements 3, 3'.

To produce the fibre composite body from the fibre semi-finished product, it is not necessary to fit the covering elements for each component geometry. It can also be suitable to release the fibre semi-finished products from the base element 2, 2' and then to impregnate them, instead of loading a sheathing formed with the covering 3, 3' with matrix material.

With the aid of the sheathing element set, which functions as a construction kit system and which comprises the cited various strut elements 1' and node elements 1, any complex three-dimensional hollow body structures 10 can be reproduced, wherein here the term "hollow body structure" refers to the inner volume surrounded by the strut elements 1' and node elements 1.

The "strut elements 1'" are here linear elements with two connecting openings, whereas the term "node elements 1" refers to all curved and branched sheathing elements that can have two or more connecting openings from there.

The reversal elements 5 can be arranged on the base elements 2, 2' of the strut elements 1' and the node elements 1.

To enable a matrix material or resin injection for the creation of the composite component in the sheathing 10 created from the sheathing elements 1, 1', at least one of these sheathing elements 1, 1', covering elements 3, 3' and/or base elements 2, 2' can have a resin injection connecting device.

The sheathing 10 that can be compiled with the sheathing element set for an endless fibre composite component, which has a complex three-dimensional hollow body structure, is constructed in such a way that each strut and node element 1, 1' forming base elements 2, 2' from the channel, and the associated covering elements 3, 3', are connected to one another according to the three-dimensional hollow body structure of the endless fibre composite component that is to be produced, thereby forming a channel system. The sheathing can be reused by its being configured of sheathing elements, since these are present with zero defects after the composite component has been produced, despite the complex three-dimensional hollow body structure.

With the sheathing, enveloped hollow body structures or framework structures of a motor vehicle can also be produced with the struts, such as a motor vehicle bodyshell structure or a passenger compartment structure. In order to be able to manufacture the composite component produced in the sheathing as true to size, the sheathing can comprise a support framework, which releasably fixes the base element connected to the channel system.

The method according to the invention serves for the automatic production of hollow bar elements of any kind, which are to be used in a framework structure such as an automobile body, a bicycle frame or other framework elements. Furthermore, the bar elements of a framework structure are additionally connected beneath one another with this method, and form a closed, contiguous and integral semi-finished product for a framework structure, which has a high level of tensile strength, compressive strength and torsional strength.

The presence of hollow bodies is essential for the embodiment of the method according to the invention, which are wrapped or braided by the method with fibre arrangements and which thus form the core of the hollow bar element. Due to its composition as hollow bodies, the aforementioned hollow bodies only influence the weight of fibre composite components, which are used in automobile construction and should conform to concept of lightweight construction, to a small extent.

Provision can be made to fill the hollow bodies with a lightweight material after the semi-finished product has been finished, said material having on the one hand a high level of shear force stability and on the other hand a significant damping effect. Thus, the components produced from these semi-finished products can be further optimised with respect to crash safety.

The method of the invention fundamentally comprises the following steps:

Firstly, one of the modular production devices of the above type is to be created. Then a number of hollow bodies 7, which is dependent on component geometry and component size, are arranged in a row on an inner wall of the base element 2, 2'; the hollow bodies 7 are arranged separated from one another by a gap 8—see FIG. 3. The fastening of the hollow bodies 7 can take place by means of their base 6. A reversal element 5 is to be provided on each front side of the provided row of hollow bodies 7 on the inner wall of the base element 2, 2'. Here, it can either be present in close contact or, if necessary, be attached hereto.

Then an endless fibre is fed in by means of the fibre guide tube 100 and the endless fibre 9 is laid along a laying path. The guiding of the fibre guide tube 100 is illustrated in FIG. 6 by means of arrow a. The method according to the invention serves for the production of a three-dimensional fibre semi-finished product, without a robot with the fibre guide tube 100 having to be guided around the entire hollow body element that is to be produced.

Figure 7:
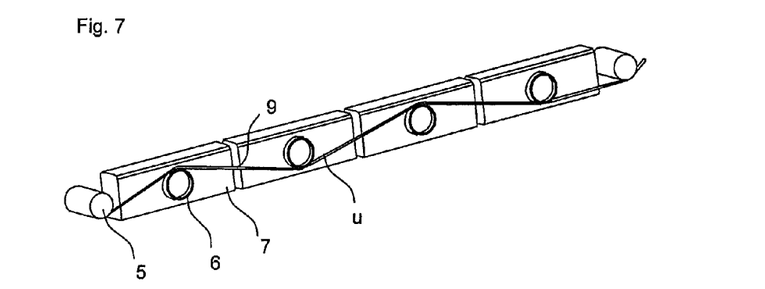

Here, for example, the laying path comprises an underfloor path u—see FIG. 7—which runs from a first reversal element 5 (starting position $a_0$) and bi-directionally around the bases 6 of the row of hollow bodies 7 to the second reversal element 5. The fibre 9 is here guided from the left-hand reversal element 5 diagonally to the first base, while the fibre progression between the last base and the right-hand reversal element is set up as a straight line. The depiction shown in FIG. 6 illustrates the guiding of the fibre guide tube 100 for the laying of the underfloor path u. Here, the side wall of the channel-shaped base element 2 facing away from the observer is cut off. The fibre guide tube 100 is guided bi-directionally through the gap 8.

Even in complex geometries, several fibre guide tubes 100 can fundamentally be guided in addition; this is to be as automatically as possible by means of corresponding robot-guided laying heads.

A potential guide path runs from the starting position $a_0$ around the reversal cylinder 5, between this and the first hollow body 7 and again on the front side (right-hand side) of the first hollow body 7, along the hollow body 7 and then through the gap 8 between the first two hollow bodies 7, along the second hollow body 7 and back through the next gap 8 and so forth, until the second reversal cylinder 5 is reached. This path system can now also be applied from the right-hand to the left-hand side and be repeated as many times as desired.

In the first course of the underfloor path u, the fibre guide tube 100 can always be guided on a place that lies at the height of the base 6 beneath the hollow body 7. What is not depicted is the system of the path course through a gap between two hollow bodies 7 if a fibre 9 has already been pulled through from here. The fibre guide tube 100 must hereby be raised between the hollow bodies 7 from the base plane to a higher plane, so as not to collide with the previously-laid fibres 9.

The fibre guide can be varied according to load requirements. The result of a first guide path from the first to the second reversal cylinder 5 is shown in FIG. 7.

Figure 8:
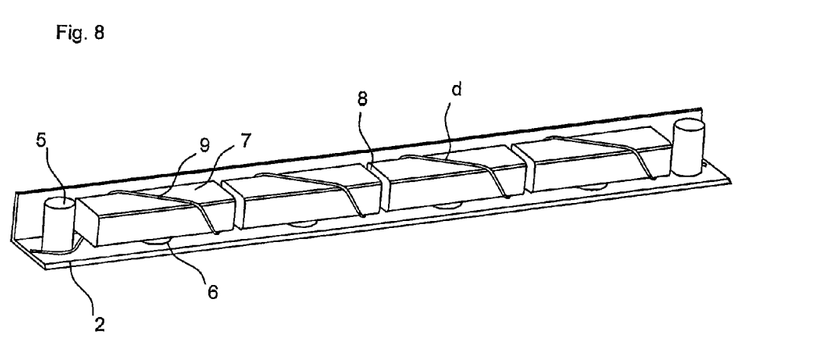

Furthermore, a path d from the method is included and is depicted as an example in FIG. 8. This describes a three-dimensional shape around the hollow bodies 7. It extends at least from a first end of the row of hollow bodies 7 to a second end. Here, a desired number of courses can also be completed.

Now, an upper path o—see FIG. 9—is laid, which runs on the side of the hollow bodies 7 facing away from the lower path and which extends from a first end of the row of hollow bodies 7 to a second end bi-directionally around the bypass adapters 8" of the intermediate-space elements 8', which have been inserted into the gap 8 before the other paths have been laid. The bypass adapter 8" of the intermediate-space body 8'—see FIG. 4—is positioned on at least one edge side of the bypass adapter.

Finally, as is depicted in FIG. 10, a side path s is laid, wherein the sides of the hollow bodies 7 are wrapped. Here, the integral fibre semi-finished product is now completed.

If needs be, the sequence of the different laying paths can be varied if fibres that have already been laid do not cross over the subsequent laying path. Laying routes of the various paths that differ from the depictions are also conceivable. In a hollow space structure forming framework structures with complex configurations, as in FIG. 13, a plurality of potential laying paths of the fibres 9 arises. In extensive hollow space structures, the use of several simultaneously-operating guide tubes is also conceivable.

The hollow bodies 7 form the core of the integral fibre semi-finished product through the laying of the endless fibres 9 along the laying path.

To obtain the endless fibre composite component, the impregnation of the fibre semi-finished product with a resin or matrix material is now still necessary.

There are fundamentally two procedures for this: The base element 2, 2' can be produced as a separate component and the hollow bodies 7 can be fitted to the base element 2, 2' by means of the base 6. After the fibre arrangement 9 has been laid, the base element 2, 2' can be removed and the fibre semi-finished product arising is guided to the composite component by resin infiltration in the typical manner.

Alternatively, the method according to the invention for the production of an endless fibre composite component with a three-dimensional hollow body structure can be embodied by using the aforementioned sheathing.

It first comprises the step of assembling the channel-forming strut and node elements from the sheathing element set, such that the formed channel system reproduces the three-dimensional hollow body structure of the component. In this channel system, the endless fibres are laid by means of the hollow bodies by completing the described laying path or by completing various laying path routes, and, after the laying process is finished, wherein the integral fibre semi-finished product has been obtained, the covering elements assigned to the base elements are arranged, whereby the channel system is hermetically sealed. Now, due to the resin injection connecting device provided for this purpose, the supply of matrix material to the channel system takes place, which forms the connection after curing with the integral fibre semi-finished product.

The subsequent deformation of the endless fibre composite component arising can take place by reducing the covering elements and removing the base elements.

Further embodiments of the method according to the invention can provide that, after or during the assembly of the base elements, a support framework is added, which fixed the base elements releasably, and which supports the channel system true to size according to the desired three-dimensional hollow body structure.

The laying of the endless fibres preferably takes place by load-suitable, traction-optimised and stress-optimised distribution of the fibres, so as to bestow the desired mechanical strength properties to the endless fibre composite component that is to be produced. The use of a single endless fibre or a single roving, and/or a single endless fibre strand, which pervade(s) the entire channel system, bestows the endless fibre composite component that is to be produced with additional mechanical strength.

The resin-injection step that is carried out after the fibres have been laid can take place by transfer moulding (RTM method).

An endless fibre composite component created according to the invention with a three-dimensional hollow body structure is characterized in that a fibre proportion existing in connection with the matrix material is provided by a single endless fibre or a single endless fibre strand, which uninterruptedly pervades the entire three-dimensional hollow body structure of the component.

The integral endless fibre composite component produced according to the invention is joint-free and coupling-free on the crossover and bending points of the hollow body structure, and can, in one embodiment of the invention, be a motor vehicle framework structure component such as, for example, a motor vehicle raw component or a passenger compartment. It consolidates the advantages of high mechanical strength and rigidity at low weight and thus allows for the lightweight construction that is sought in motor vehicle construction.

Figure 12:
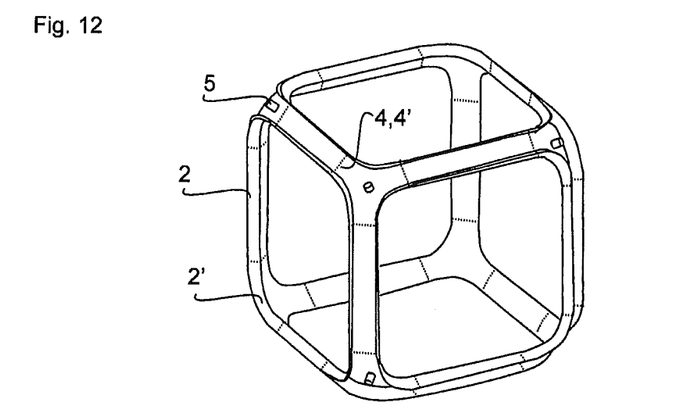

In FIG. 12, the base elements 2, 2' of the strut and node elements that are added to the channel system are to be seen, which are connected to one another at their connecting openings 4, 4' and thus form the channel system that runs along the cube edge. The node base elements 2' are thus arranged in the rounded cube corners and each have a fibre distribution pin 5 in the crossover point of the channels, which fulfils the object of the reversal element. As is to be seen in FIG. 13, an endless fibre 9 laid with the aid of the guide tube—an endless fibre strand would also apply—can be installed within the channel system in a different manner with the aid of the reversal element 5, until the entire channel system is pervaded with a single endless fibre.

Figure 13:
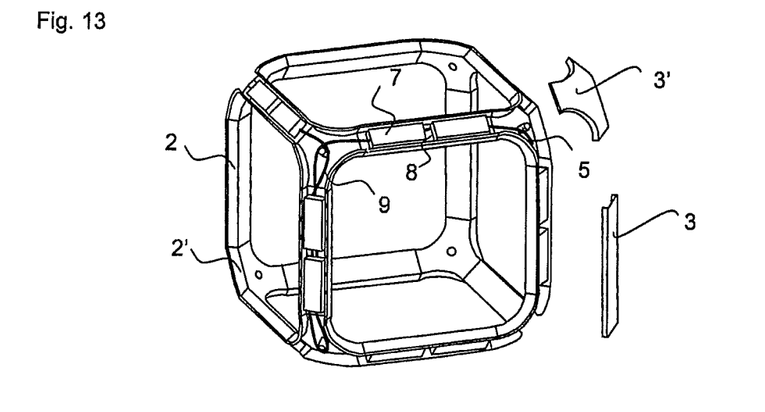

In FIG. 13, a node covering element 3' and a strut covering element 3 are also shown, which are attached to the respective base elements 2, 2' after the endless fibres 9 have been laid, such that the entire channel system, as can be seen in FIG. 14, is hermetically sealed. The sheathing 10 shown here can now be infiltrated with resin by resin injection. For this purpose, a resin injection device (not depicted) can be provided on one or more of the sheathing elements. If it should arise that the mould cavity, which is formed by the channel system that is hermetically sealed with the covering elements, is to be evacuated before the resin injection to prevent air pockets arising, a corresponding connection device (also not depicted) can also be provided on one of the sheathing elements 1, 1' for connection with a vacuum pump.

In this way, the method according to the invention, which is embodied with the device according to the invention, enables the automatic production of hollow integral fibre semi-finished products. The final pre-moulding consists of one or more endless fibres and can be produced by machine. Individual bar elements or highly complex bar structures can be set up as adjusted to the loading conditions.

The invention claimed is:

1. A modular production device for integral fibre semi-finished products made from endless fibres (9) for the production of endless fibre composite components having a hollow body structure, wherein the modular production device includes at least
a moveably guided fibre guide tube (100),
at least one base element (2,2'),
a plurality of hollow bodies (7) that are separated from one another in a row by a gap (8) and that can be fastened to an inner wall of the base element (2, 2'), wherein each hollow body (7) has at least one base (6) at least on one side, and wherein the gap (8) has a width that provides a passage for the fibre guide tube (100), and
a plurality of intermediate-space bodies (8'), wherein an intermediate-space body (8') can be inserted into the gap (8) in an accurately fitting manner with respect to a gap shape, and
wherein the base element (2, 2') has a respective reversal element (5) on the inner wall at the front of the provided row of hollow bodies (7).

2. A modular production device according to claim 1, wherein the modular production device comprises the base element (2, 2') with at least one covering element (3, 3') that can be fastened releasably to the base element (2, 2') as a sheathing element (1, 1') for the endless fibre composite components.

3. The modular production device according to claim 2, wherein the modular production device contains a plurality of sheathing elements (1, 1') as components of a sheathing element set for the formation of three-dimensional hollow body structures, wherein the sheathing element set has a plurality of channel-forming base elements (2, 2'), which provide connecting openings (4, 4'), via which at least two base elements (2, 2') can be connected positively to one another.

4. The modular production device according to claim 3, wherein the sheathing elements (1, 1') of the sheathing element set are strut elements (1) and node elements (1') for the construction of an hermetically sealed three-dimensional sheathing structure (10), wherein the strut elements (1) and node elements (1') each consist of the channel-forming base elements (2, 2) and the covering elements (3, 3').

5. The modular production device according to claim 1, wherein the base (6) provides a hollow body filling opening.

6. The modular production device according to claim 1, wherein a protrusion is provided on the inner wall of the base element (2, 2') for each hollow body (7) that is to be fixed, which can be brought into releasable engagement positively with at least one base (6).

7. The modular production device according to claim 1, wherein the hollow body (7) is polyhedral, cylindrical or a body with an elliptical cross-section.

8. The modular production device according to claim 1, wherein the intermediate-space body (8') has a bypass adapter (8") on at least one edge side.

9. A method for the production of endless fibre composite components having a hollow body structure, by using a production device according to claim 1, comprising the following steps:
providing the modular production device, then arranging the plurality of hollow bodies (7) in a row on an inner wall of the base element (2, 2'), separating the hollow bodies (7) with a gap (8) from one another and fixing the hollow bodies (7) to the base element (2, 2') by means of the at least one base (6), wherein each reversal element (5) is provided on the front of the provided row of hollow bodies (7) on the inner wall of the base element (2, 2'), supplying an endless fibre by means of the fibre guide tube (100) and laying the endless fibre (9) along a laying path, which comprises at least:

a) an underfloor path (u), which runs from a first reversal element (5) and bi-directionally around the base (6) of the row of hollow bodies (7) to the second reversal element (5), before guided the fibre guide tube (100) through the gap (8), b) a path (d), which describes a three-dimensional shape around the hollow bodies (7) and which extends at least from a first end of the row of hollow bodies (7) to a second end, c) an upper path (o), which runs on the side of the hollow bodies (7) facing away from the lower path (u) and which extends from a first end of the row of hollow bodies (7) to a second end bi-directionally around the bypass adapters (8") of the intermediate-space elements (8'), which have been inserted into the gap (8) before the other paths have been laid, and d) a side path (s), wherein the sides of the hollow bodies (7) are wrapped, then an integral fibre semi-finished product is obtained, wherein the hollow bodies (7) form a core of the integral fibre semi-finished product by laying the endless fibres (9) along the laying path, then impregnating the fibre semi-finished product with a resin material and obtaining the endless fibre composite component.

10. The method according to claim 9, comprising the following steps:

connecting at least two base elements (2, 2') positively with one another at their connecting openings (4, 4') to provide the modular production device, and after an integral fibre semi-finished product has been obtained, fastening a covering element (3, 3') releasably to a respective channel-forming base element (2, 2'), then obtaining a sheathing element (1, 1') and impregnating the fibre semi-finished product with a resin material by filling the sheathing element (1, 1').

11. The method according to claim 10, comprising the following steps:

providing the modular production device, connecting a plurality of channel-forming base elements (2, 2'), which are designed as strut elements (1) and node elements (1'), positively to one another on their connecting openings (4, 4'), then building a three-dimensional structure, and after an integral fibre semi-finished product has been obtained, releasably fastening a covering element (3, 3') to a respective base element (2, 2'), then obtaining an hermetically sealed three-dimensional sheathing structure (10) and impregnating the fibre semi-finished product with a resin material by filling the sheathing structure (10).

12. The method according to claim 9, wherein the impregnation of the fibre semi-finished product is carried out with a resin material after removing the fibre semi-finished product made from endless fibres (9) from the base element (2, 2').

13. The method according to claim 9, comprising the following step:

filling the hollow body (7) before embodying the laying path after the laying path has been completed or after the fibre semi-finished product made from endless fibres (9) has been removed from the base element (2, 2'), then filling the hollow bodies (7) with a filling material through the at least one base (6).

14. The method according to claim 12, wherein the impregnation of the fibre semi-finished product is carried out by using a vacuum bag.

\* \* \* \* \*